US010213817B2

(12) United States Patent
Zhang

(10) Patent No.: US 10,213,817 B2
(45) Date of Patent: Feb. 26, 2019

(54) METHOD AND DEVICE FOR ANAEROBIC PYROLYSIS TREATMENT OF DEAD-OF-DISEASE LIVESTOCK AND MUNICIPAL ORGANIC REFUSE

(71) Applicants: Mississippi International Water Inc., New York, NY (US); Amazon Environmental Protection Technology and Equipment PTE. Ltd., Singapore (SG); Dawei Zhang, Shenyang (CN)

(72) Inventor: Dawei Zhang, Shenyang (CN)

(73) Assignees: Mississippi International Water Inc., New York, NY (US); Amazon Environmental Protection Technology and Equipment PTE. LTD., Singapore (SG)

( * ) Notice: Subject to any disclaimer, the term of this patent is extended or adjusted under 35 U.S.C. 154(b) by 512 days.

(21) Appl. No.: 15/033,563

(22) PCT Filed: Sep. 17, 2014

(86) PCT No.: PCT/CN2014/086705
§ 371 (c)(1),
(2) Date: Apr. 29, 2016

(87) PCT Pub. No.: WO2015/043401
PCT Pub. Date: Apr. 2, 2015

(65) Prior Publication Data
US 2016/0339488 A1 Nov. 24, 2016

(30) Foreign Application Priority Data

Sep. 29, 2013 (CN) .......................... 2013 1 0453320

(51) Int. Cl.
*C10B 1/00* (2006.01)
*B09B 3/00* (2006.01)
(Continued)

(52) U.S. Cl.
CPC ............ *B09B 3/0091* (2013.01); *C02F 1/283* (2013.01); *C05F 1/00* (2013.01); *C05F 1/02* (2013.01);
(Continued)

(58) Field of Classification Search
USPC ............................................. 201/25; 202/96
See application file for complete search history.

(56) References Cited

U.S. PATENT DOCUMENTS 4,000,705 A * 1/1977 Raber ..................... C10B 53/00
110/194
6,244,198 B1 * 6/2001 Suominen ................. C10B 7/14
110/219
(Continued)

FOREIGN PATENT DOCUMENTS

CN 1396244 A 2/2003
CN 1863606 A 11/2006
(Continued)

OTHER PUBLICATIONS

International Search Report for PCT/CN2014/086705 dated Dec. 23, 2014.

*Primary Examiner* — Nina Bhat
(74) *Attorney, Agent, or Firm* — Kilpatrick Townsend & Stockton LLP

(57) ABSTRACT

Disclosed is a method for anaerobic pyrolysis treatment of dead-of-disease livestock and municipal organic refuse, which uses an anaerobic pyrolysis device to perform a harmlessness treatment on dead-of-disease pigs, the treatment being a chemical reaction process performed in a sealed, oxygen-free, non-combustible, high-temperature state, comprising heating the bodies of pigs to a high temperature under an anaerobic state, and by the action of thermal decomposition through reactions such as vaporization, pyrolysis, dehydrogenation, thermal condensation and
(Continued)

carbonization, evaporating the moisture from the pig bodies, converting the organics therein to combustible gases and organic carbon, and killing various types of bacteria in the bodies of the dead pigs via the high temperature. Thus, a harmlessness and reutilization treatment of the dead-of-disease livestock is achieved, and environmental pollution and propagation of fatal animal diseases, such as foot-and-mouth disease, highly pathogenic avian influenza, highly pathogenic blue-ear pig disease and swine fever are avoided. Also disclosed is a device for realizing the above-mentioned method.

11 Claims, 4 Drawing Sheets

(51) Int. Cl.
  *C05F 1/00* (2006.01)
  *C05F 1/02* (2006.01)
  *F23G 5/027* (2006.01)
  *C02F 1/28* (2006.01)
  *C10B 7/10* (2006.01)
  *C10B 41/00* (2006.01)
  *C10B 53/00* (2006.01)
  *C10B 57/00* (2006.01)
  *C05F 9/00* (2006.01)

(52) U.S. Cl.
  CPC .................. *C05F 9/00* (2013.01); *C10B 7/10* (2013.01); *C10B 41/00* (2013.01); *C10B 53/00* (2013.01); *C10B 57/005* (2013.01); *F23G 5/027* (2013.01); *F23G 2900/7009* (2013.01); *Y02A 40/201* (2018.01); *Y02A 40/204* (2018.01); *Y02A 40/214* (2018.01); *Y02E 50/343* (2013.01); *Y02P 20/145* (2015.11); *Y02W 30/47* (2015.05)

(56) References Cited

U.S. PATENT DOCUMENTS

| | | | | |
|---|---|---|---|---|
| 8,100,990 | B2* | 1/2012 | Ellens | C10B 49/10 |
| | | | | 201/13 |
| 8,476,480 | B1* | 7/2013 | Brown | C10K 1/04 |
| | | | | 585/240 |
| 9,221,062 | B2* | 12/2015 | Sieger | B03C 3/00 |
| 2006/0004237 | A1* | 1/2006 | Appel | A61L 11/00 |
| | | | | 585/241 |
| 2008/0264771 | A1* | 10/2008 | Dam-Johansen | C10B 47/22 |
| | | | | 201/4 |
| 2009/0062581 | A1* | 3/2009 | Appel | C10G 1/002 |
| | | | | 585/241 |
| 2010/0282588 | A1 | 11/2010 | Whitton et al. | |

FOREIGN PATENT DOCUMENTS

| | | |
|---|---|---|
| CN | 102765973 A | 11/2012 |
| CN | 103599916 A | 2/2014 |
| CN | 203494875 U | 3/2014 |

* cited by examiner

METHOD AND DEVICE FOR ANAEROBIC PYROLYSIS TREATMENT OF DEAD-OF-DISEASE LIVESTOCK AND MUNICIPAL ORGANIC REFUSE

CROSS-REFERENCE TO RELATED APPLICATIONS

This application is the U.S. National Stage Entry Under § 371 of International Application No. PCT/CN2014/086705, filed Sep. 17, 2014, which claims priority to China Patent Application No. 201310453320.8, filed Sep. 29,2013.

TECHNICAL FIELD

The invention relates to a method for treating pollutants, and specifically to a method for anaerobic pyrolysis treatment of dead-of-disease livestock and municipal organic refuse.

The invention also relates to a device for realizing the above-mentioned method.

BACKGROUND ART

Chinese economic reform and economic development proceed, the animal husbandry in our country has been rapidly developed, and the "shopping baskets" of residents have been greatly improved and the living standard of people has been increased. The animal husbandry in our country excellently contributes to agriculture and domestic economy: in 2010, the production of meats is 79.25 million tons and has been in the first place in the world for 21 years; the production of poultry eggs is 27.65 million tons and has been in the first place in the world for 26 years; and the production of milks is 37.80 million tons and is in the third place in the world. With rapid development of animal husbandry, the environment of urban areas and the ecological environment of rural areas encounter great stress, and the pollution caused by the livestock and poultry breeding is more and more severe. Therefore, it has been a significant and urgent task for rural environmental protection to enhance pollution control and environmental management of livestock and poultry breeding.

By taking Jiaxing city, Zhejiang province as an example, Jiaxing city lies in the center of Changjiang River Delta, and is near to Suzhou, Hangzhou, Shanghai, on the north, the south, and the east, respectively. Pig breeding has been developed since early 1990s, and nearby markets are mainly supplied. As a conventional intensive pig breeding region, the number of pig breeding units in the entire Jiaxing city has exceeded 100 thousand, and the number of fully grown pigs per year is 4.5 million. Under the conditions of extensive and intensive feeding, high death rate of pigs is unavoidable. In general, the death rate of adult sows per year is up to 2%-3%, the death rate of middle-age pigs is up to 7%-8%, and the death rate of piglets is even higher. According to local reports of special topics by CCTV, the average total death rate, from the time when a piglet is born to the time when it is fully grown, is 10%. Based on the calculation according to the data described above, the number of dead pigs for various reasons in Jiaxing area per year is up to hundreds of thousands. A large number of dead-of-disease livestock are not subjected to harmlessness treatment every year and some are even discarded into rivers, which does not only severely pollute the environment but also propagates fatal animal diseases, such as foot-and-mouth disease, highly pathogenic avian influenza, highly pathogenic blue-ear pig disease, and swine fever.

Municipal domestic refuse is solid waste produced in human life. In the process of collection, transportation and treatment, harmful components contained in and produced from the refuse will pollute the atmosphere, the soil, bodies of water. This does not only severely affect the quality of the municipal environment but also threatens health of people, and thus it becomes one of social public hazards. The annual production of municipal refuse per capita in China is up to 440 kilograms. In 1996, the amount of cleaned and transported municipal domestic refuse in China is up to 100 million tons, and increases at a rate of 8% to 10% per year. The amount of stockpiled municipal refuse in past years is up to 6 billion tons, and more than 200 cities in the whole country are surrounded by refuse. The stockpiled refuse occupies a land area of up to 500 million square meters. How to solve the problem of municipal refuse to provide a healthy and clean living environment to urban and rural residents has been highly focused in the whole society.

At present, organic refuse, such as dead-of-disease livestock and municipal refuse, are treated by incineration in many places. The process of incineration treatment does not only generate hydrogen sulfide (odor) which pollutes air, but also emits a number of toxic and harmful substances such as dioxin, nitrogen oxides, and sulfur dioxide, which affect health of residents nearby. The main reason why the above organic refuse such as dead-of-disease livestock and municipal refuse generates toxic and harmful substances, such as hydrogen sulfide (odor), dioxin, nitrogen oxides and sulfur dioxide, is the pyrolysis (combustion) treatment performed in an aerobic state. In dead-of-disease livestock and municipal refuse, ammonia nitrogen generates nitrogen oxides by the pyrolysis (combustion) in an aerobic state; sulfur generates sulfur dioxide by the pyrolysis (combustion) in an aerobic state; chloride ions generate dioxin by the pyrolysis (combustion) in an aerobic state; and carbon generates carbon dioxide and the like by the pyrolysis (combustion) in an aerobic state.

An anaerobic pyrolysis method and device for pyrolyzing organic refuse such as dead-of-disease livestock and municipal refuse in an anaerobic state, so as to solve the problems of reutilization and harmlessness treatment of organic refuse such as dead-of-disease livestock and municipal refuse generated during production and living of human beings and to prevent the generation of toxic and harmful substances such as hydrogen sulfide (odor), dioxin, nitrogen oxides and sulfur dioxide, has not been reported so far.

SUMMARY

An object of the invention is to provide a device for treating dead-of-disease livestock and municipal organic refuse by anaerobic pyrolysis.

Another object of the invention is to provide a method for treating dead-of-disease livestock and municipal organic refuse by anaerobic pyrolysis.

In order to achieve the above-mentioned objects, the invention provides a device for anaerobic pyrolysis treatment of dead-of-disease livestock and municipal organic refuse, which comprises:

an anaerobic pyrolysis device, wherein an isolation room and an equipment room are sequentially disposed at one end of the anaerobic pyrolysis device, a dust collection room is disposed between the isolation room and the equipment room, an air outlet is disposed on the top of the dust collection room, and the air outlet is connected with a dedusting device; a power room is disposed at the other end of the anaerobic pyrolysis device, and a combustion chamber of the anaerobic pyrolysis device is disposed between the power room and the equipment room;

an anaerobic pyrolysis chamber is disposed inside the combustion chamber, a conveying pipeline is disposed at one end and a driving cylinder is disposed at the other end of the anaerobic pyrolysis chamber, wherein the outer end of the conveying pipeline extends into the isolation room, and the driving cylinder is in the power room;

a gas discharge pipe is disposed in the isolation room, the lower part of the gas discharge pipe is connected with a gas discharge port at the bottom of the isolation room, the gas discharge port is connected with a spray column, a gas outlet of the spray column is connected with an air inlet of a coal gas discharge and feed fan, and an air outlet of the coal gas discharge and feed fan is connected with a combustor; and an inspection port is disposed on the top of the isolation room which is vertically opposite to the gas discharge pipe;

two water spray pipes are mounted in the inspection port on the top of the isolation room, one of the water spray pipes extends into the gas discharge pipe, the other one of the water spray pipes extends to an inner floor of the isolation room, and a bio-oil discharge port is disposed at the inner floor of the isolation room;

a conveying sleeve is mounted along the axis in the conveying pipeline, one end of the conveying sleeve protrudes from the conveying pipeline, and the other end of the conveying sleeve extends into the anaerobic pyrolysis chamber and is fixed to a discharge plate by welding; a spiral plate is disposed in the conveying pipeline, the vertical intersection angle between the spiral plate and the conveying pipeline is 5°-15° sinistrally, and the height of the spiral plate is 20-30% of the diameter of the conveying pipeline; and a screw conveyor is disposed on the outer face of the isolation room, the screw conveyor passing through the isolation room and extending into the conveying sleeve;

an activated steam conveying pipe is mounted along the axis in the driving cylinder, an inner end plate of the activated steam conveying pipe is in close contact with a baffle ring of the driving cylinder, and a fixing plate of the activated steam conveying pipe is in connection with the outer end of the driving cylinder;

a wireless temperature transmitter is mounted on the fixing plate, a sensing element of the wireless temperature sensor is horizontally mounted along the activated steam conveying pipe and extends into the anaerobic pyrolysis chamber; and the outer end of the activated steam conveying pipe is connected with an external steam pipe.

In one embodiment of the device, the housing of the combustion chamber is a thermal insulation material.

In one embodiment of the device, a temperature sensor, a pressure sensor, a combustible gas sensor, an oxygen content sensor, and a steam input pipe are disposed on the top of the isolation room.

In one embodiment of the device, the wireless temperature sensor, the temperature sensor, the pressure sensor, the combustible gas sensor, and the oxygen content sensor transmit parameters of temperature, pressure, combustible gas, oxygen content at respective sites of the anaerobic pyrolysis device to an electrical control cabin respectively, and the anaerobic pyrolysis device is operated under the control of the electrical control cabin.

In one embodiment of the device, an explosion proof and inspection port is disposed on the top of the isolation room.

In one embodiment of the device, the fixing plate of the activated steam conveying pipe is in connection with a flange plate at the outer end of the driving cylinder by fastening with a bolt.

In one embodiment of the device, the outer end of the activated steam conveying pipe is connected with the external steam pipe via a connecting hose and a rotatable joint.

The invention further provides a method for anaerobic pyrolysis treatment of dead-of-disease livestock and municipal organic refuse, comprising the steps of:

conveying bodies of dead-of-disease pigs or/and municipal organic refuse, after being treated by a crusher, to a rotating anaerobic pyrolysis chamber through a screw conveyor and a conveying pipeline of an anaerobic pyrolysis device;

increasing the temperature inside the anaerobic pyrolysis chamber to 300-500° C. to perform vaporization and pyrolysis reaction of the bodies of dead-of-disease pigs or/and the municipal organic refuse at high temperature, and conveying the generated gas through a gas discharge pipe and a gas discharge port to a spray column for performing a cleaning and separation treatment, such that steam in the gas is condensed into condensed water, and the remaining uncondensed combustible gases are conveyed to a combustor through a coal gas discharge and feed fan, to be recovered and reutilized as fuel of the anaerobic pyrolysis device; and discharging bio-oil in an isolation room from a bio-oil discharge port at the bottom to allow the bio-oil flow into an oil storage tank;

increasing the temperature inside the anaerobic pyrolysis chamber to 500-600° C., to convert the bodies of dead-of-disease pigs or/and the municipal organic refuse to organic carbon through dehydrogenation, thermal condensation and carbonization reactions; continuously heating the organic carbon to 750-900° C., and feeding activated steam through an activated steam conveying pipe into the anaerobic pyrolysis chamber, for carrying out an activation reaction with the organic carbon, so as to perform an activation treatment on the organic carbon; and reversely rotating the anaerobic pyrolysis chamber after activation, such that the activated organic carbon passes through a discharge port in the anaerobic pyrolysis chamber and enters into a cooling device.

In the method, the gas generated by increasing the temperature inside the anaerobic pyrolysis chamber to 300-500° C. is a gas composed of steam, hydrogen, methane, ethane, and carbon monoxide.

In the method, the activated organic carbon is used as a water-treating material and a soil amendment.

The device and the method for anaerobic pyrolysis treatment of dead-of-disease livestock and municipal organic refuse as provided by the invention use an anaerobic pyrolysis device to perform a harmlessness treatment on dead-of-disease pigs, the treatment being a chemical reaction process performed in a sealed, oxygen-free, non-combustible, high-temperature state, comprising heating the bodies of pigs to a high temperature under an anaerobic state, and by the action of thermal decomposition through reactions such as vaporization, pyrolysis, dehydrogenation, thermal condensation and carbonization, evaporating the moisture from the pig bodies, converting the organics therein to combustible gases and organic carbon, and killing various types of bacteria in the bodies of the dead pigs via the high temperature. Thus, a harmlessness and reutilization treatment of the dead-of-disease livestock is achieved, and environmental pollution and propagation of fatal animal diseases, such as foot-and-mouth disease, highly pathogenic avian influenza, highly pathogenic blue-ear pig disease and swine fever are avoided.

DESCRIPTION OF REFERENCE NUMERALS OF MAIN COMPONENTS IN THE FIGURES

Figure 1:
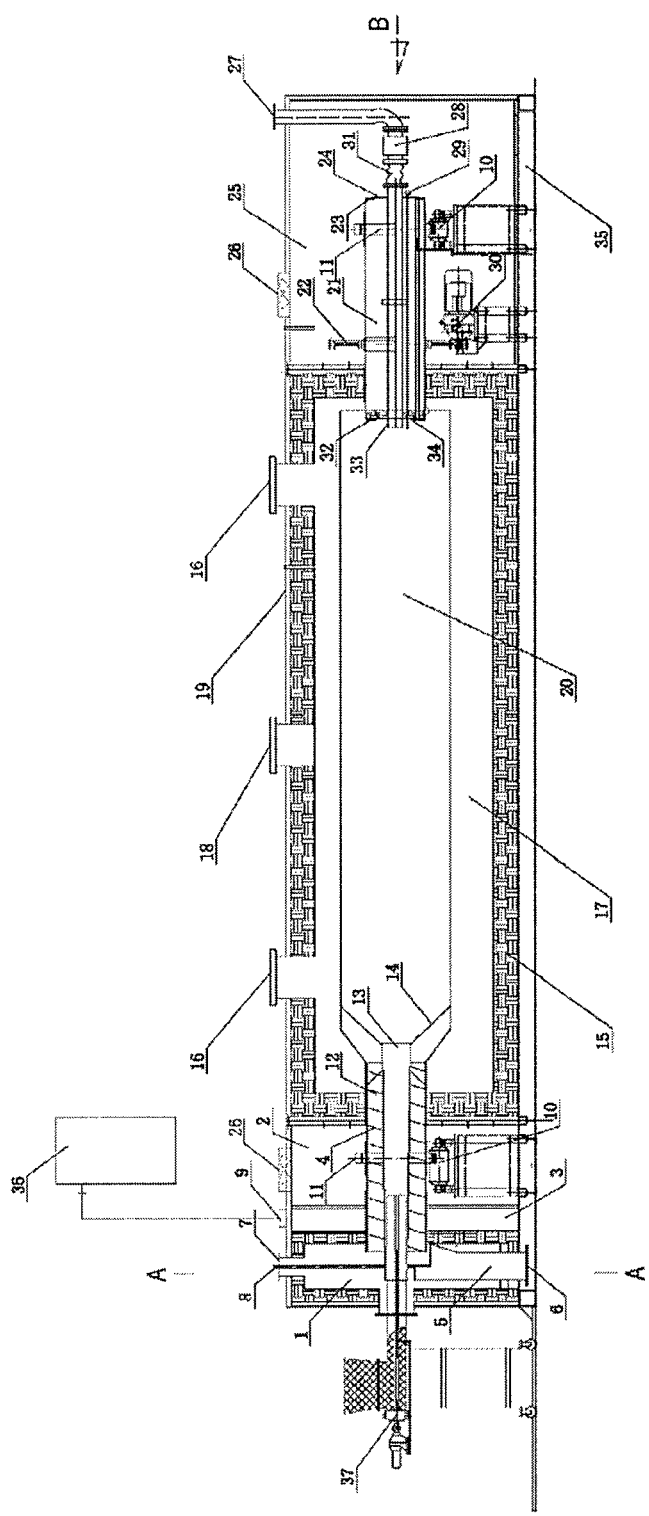
FIG. 1 is a sectional view of the structure of the invention.

1: isolation room; 2: equipment room; 3: dust collection room; 4: spiral plate; 5: discharge pipe; 6: discharge port; 7: inspection port; 8: water spray pipe; 9: air outlet; 10: supporting roller; 11: supporting ring; 12: conveying pipeline; 13: conveying sleeve; 14: discharge plate; 15: thermal insulation material; 16: explosion proof port; 17: combustion chamber; 18: flue gas port; 19: metal housing; 20: anaerobic pyrolysis chamber; 21: driving cylinder; 22: driving gear; 23: flange plate; 24: fixing plate; 25: power room; 26: exhaust fan; 27: external steam pipe; 28: rotatable joint; 29: wireless temperature transmitter; 30: transmission and electric motor; 31: connecting hose; 32: baffle ring; 33: activated steam conveying pipe, 34: inner end plate; 35: base; 36: dedusting device; 37: screw conveyor; 38: gas discharge pipe; 39: gas discharge port; 40: bio-oil discharge port; 41: temperature sensor; 42: pressure sensor; 43: combustible gas sensor; 44: oxygen content sensor; 45: steam input pipe; 46: explosion proof and inspection port; 47: combustor; 48: spray column; 49: cooling device; 50: oil storage tank; 51: metal gate; 52: ventilation hole; 53: coal gas discharge and feed fan; 54: electrical control cabin.

DESCRIPTION OF EMBODIMENTS

The anaerobic pyrolysis device provided by the invention comprises:

an isolation room disposed at one end of the anaerobic pyrolysis device, a power room disposed at the other end, a dust collection room between the isolation room and an equipment room, and a combustion chamber between the equipment room and the power room;

an anaerobic pyrolysis chamber of the anaerobic pyrolysis device, with a conveying pipeline at one end and a driving cylinder at the other end of the anaerobic pyrolysis chamber, wherein, the anaerobic pyrolysis chamber is mounted in the combustion chamber, the conveying pipeline extends into the isolation room, and the driving cylinder is in the power room.

In the device, a gas discharge port is disposed at the bottom of the isolation room.

In the device, a gas discharge pipe is disposed in the isolation room, the lower part of the gas discharge pipe is connected with the gas discharge port, and an inspection port is disposed on the top of the isolation room which is vertically opposite to the gas discharge pipe.

In the device, two water spray pipes are mounted in the inspection port on the top of the isolation room, one of the water spray pipes extends into the gas discharge pipe, and the other one of the water spray pipes extends to an inner floor of the isolation room.

In the device, a bio-oil discharge port is disposed at the inner floor of the isolation room.

In the device, a temperature sensor, a pressure sensor, a combustible gas sensor, an oxygen content sensor, and a steam input pipe are disposed on the top of the isolation room. A screw conveyor is disposed on the outer face of the isolation room, and the screw conveyor passes through the isolation room and extend into the conveying sleeve.

In the device, an explosion proof port is disposed on the top of the isolation room.

In the device, a discharge spiral plate is disposed on the wall of the conveying pipeline, a conveying sleeve is mounted along the axis in the conveying pipeline, one end of the conveying sleeve protrudes from the conveying pipeline, and the other end of the conveying sleeve extends into the anaerobic pyrolysis chamber and is fixed to a discharge plate by welding.

In the device, the dust collection room is disposed between the isolation room and the equipment room, an air outlet is disposed on the top of the dust collection room, and the air outlet is connected with a dedusting device.

In the device, an activated steam conveying pipe is mounted along the axis in the driving cylinder, an inner end plate of the activated steam conveying pipe is in close contact with a baffle ring of the driving cylinder at a joint with the anaerobic pyrolysis chamber, and a fixing plate at the outer end of the activated steam conveying pipe is in connection with a flange plate at the outer end of the driving cylinder by fastening with a bolt. A wireless temperature transmitter is mounted on the fixing plate at the outer end of the activated steam conveying pipe, and a sensing element of the wireless temperature sensor is mounted along the activated steam conveying pipe and extends into the anaerobic pyrolysis chamber. The outer end of the activated steam conveying pipe is connected with a rotatable joint and an external steam pipe via a connecting hose.

In the invention, the gas discharge port of the anaerobic pyrolysis device is disposed at the bottom of the isolation room, the gas discharge pipe is allowed to extend into the isolation room, and vertically opposite to which, the inspection port is disposed on the top of the isolation room; water spray pipes are mounted at the inspection port, a spray nozzle is mounted at one end of the water spray pipe and extends into the gas discharge pipe, so as to prevent the blockage of the gas discharge pipe and keep the gas discharge pipe to be always unobstructed.

In the invention, a bio-oil discharge port is disposed at the inner floor of the isolation room to discharge bio-oil from the isolation room. In this way, recovery and utilization of resources are achieved, the labor intensity of operators is reduced, and the environmental pollution in workshops is prevented.

The present invention will be described in details in conjunction with the accompanying drawings below.

Figure 2:
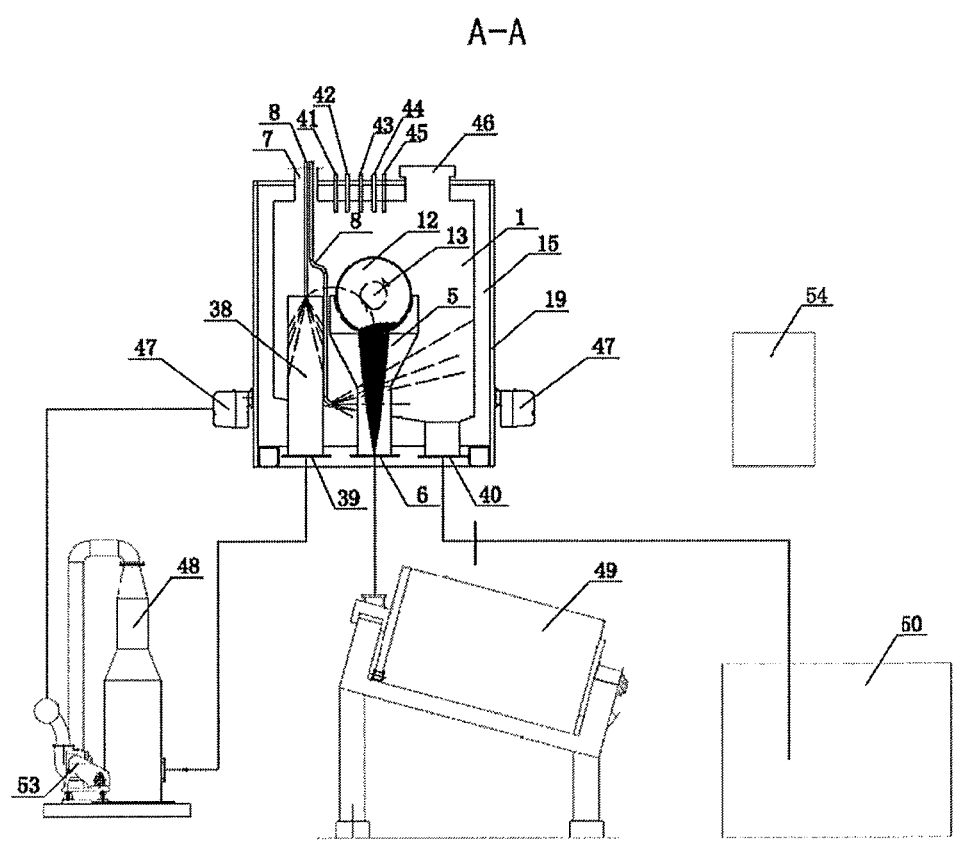
FIG. 2 is a sectional view along the direction of A-A in FIG. 1.
Figure 3:
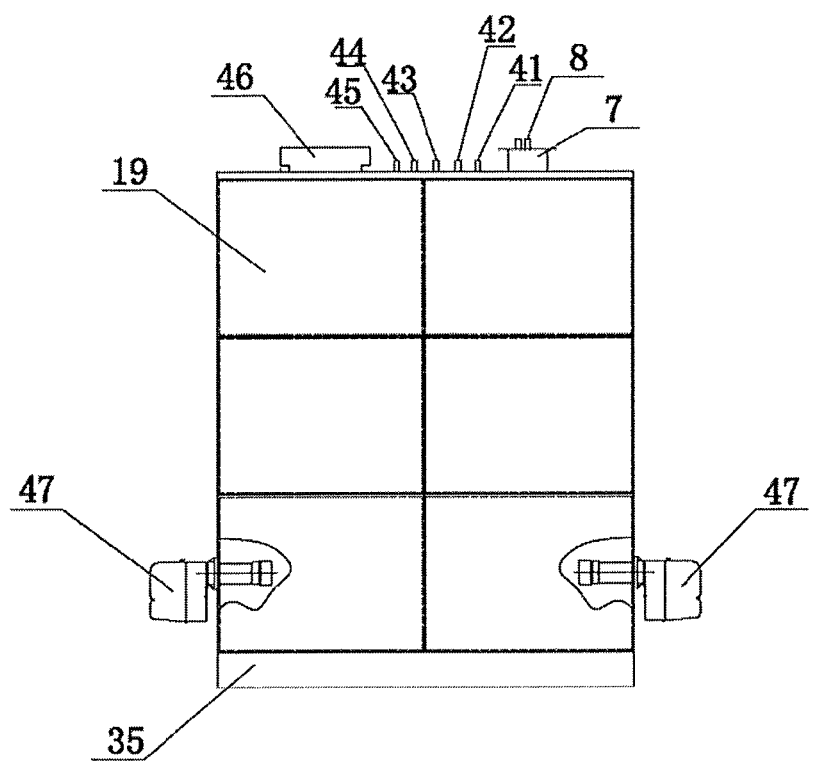
FIG. 3 is a schematic view along the B direction in FIG. 1.
Figure 4:
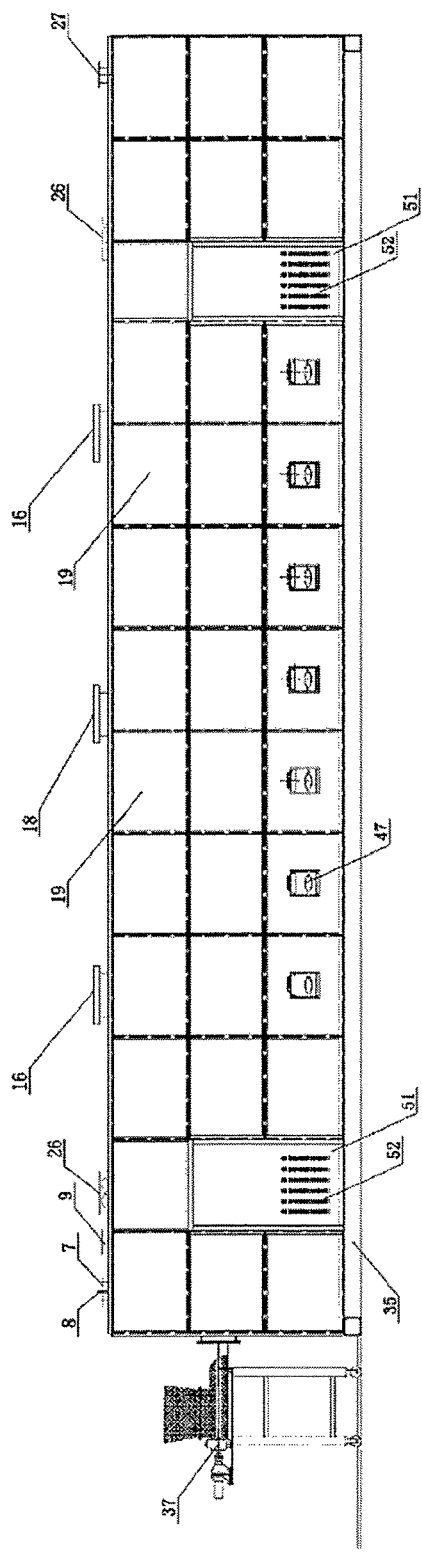
FIG. 4 is a schematic view of the profile of the invention.

With reference to the drawings, FIG. 1, FIG. 2, and FIG. 3 are schematic views of the structure of the anaerobic pyrolysis device provided by the invention, and FIG. 4 is a schematic view of the profile of the invention.

Provided is an anaerobic pyrolysis device, in which an isolation room 1 and an equipment room 2 are sequentially disposed at one end, with a dust collection room 3 between the isolation room 1 and the equipment room 2; and a power room 25 is disposed at the other end of the anaerobic pyrolysis device. A combustion chamber 17 of the anaerobic pyrolysis device is disposed between the power room 25 and the equipment room 2.

The housing of the combustion chamber 17 is a thermal insulation material 15, an anaerobic pyrolysis chamber 20 is inside the combustion chamber 17, and a conveying pipeline 12 is disposed at one end and a driving cylinder 21 is disposed at the other end of the anaerobic pyrolysis chamber 20. The outer end of the conveying pipeline 12 extends into the isolation room 1, and the driving cylinder 21 is in the power room 25.

A gas discharge port 39 is disposed at the bottom of the isolation room 1. The gas discharge port 39 is connected with a spray column 48 which is provided with a water spray pipe 8, the gas outlet of the spray column 48 is connected with an air inlet of a coal gas discharge and feed fan 53, and an air outlet 9 of the coal gas discharge and feed fan 53 is connected with a combustor 47. The combustor 47, the spray column 48, and the coal gas discharge and feed fan 53 are all well-known devices.

A gas discharge pipe 38 is disposed in the isolation room 1, the lower part of the gas discharge pipe 38 is connected with the gas discharge port 39, and an inspection port 7 is disposed on the top of the isolation room 1, which is vertically opposite to the gas discharge pipe 38.

Two water spray pipes 8 are mounted in the inspection port 7 on the top of the isolation room 1, one of the water spray pipes 8 extends into the gas discharge pipe 38, and the other one of the water spray pipes 8 extends to an inner floor of the isolation room 1.

A bio-oil discharge port 40 is disposed at the inner floor of the isolation room 1.

A temperature sensor 41, a pressure sensor 42, a combustible gas sensor 43, an oxygen content sensor 44, and a steam input pipe 45 are disposed on the top of the isolation room 1. A screw conveyor 37 is disposed on the outer face of the isolation room 1, the screw conveyor 37 passing through the isolation room 1 and extending into a conveying sleeve 13.

An explosion proof and inspection port 46 is disposed on the top of the isolation room 1.

The conveying sleeve 13 is mounted along the axis in the conveying pipeline 12, one end of the conveying sleeve 13 protrudes from the conveying pipeline 12, and the other end of the conveying sleeve 13 extends into the anaerobic pyrolysis chamber 20 and is fixed to a discharge plate 14 by welding. A spiral plate 4 is disposed inside the conveying pipeline 12, the vertical intersection angle between the spiral plate 4 and the conveying pipeline 12 is 5°-15° sinistrally, and the height of the spiral plate 4 is 20-30% of the diameter of the conveying pipeline 12.

An air outlet 9 is disposed on the top of the dust collection room 3, and the air outlet 9 is connected with a dedusting device 36. The dedusting device 36 is a well-known device.

An activated steam conveying pipe 33 is mounted along the axis in the driving cylinder 21, an inner end plate 34 of the activated steam conveying pipe 33 is in close contact with a baffle ring 32 of the driving cylinder 21, and a fixing plate 24 of the activated steam conveying pipe 33 is in connection with a flange plate 23 at the outer end of the driving cylinder 21 by fastening with a bolt. A wireless temperature transmitter 29 is mounted on the fixing plate 24 of the activated steam conveying pipe 33, and a sensing element of the wireless temperature sensor 29 is horizontally mounted along the activated steam conveying pipe 33 and extends into the anaerobic pyrolysis chamber 20. The outer end of the activated steam conveying pipe 33 is connected with an external steam pipe 27 via a connecting hose 31 and a rotatable joint 28.

In the invention, the gas discharge port 39 of the anaerobic pyrolysis device is disposed at the bottom of the isolation room 1, the gas discharge pipe 38 is allowed to extend into the isolation room 1, and vertically opposite to which, the inspection port 7 is disposed on the top of the isolation room 1. Water spray pipes 8 are mounted at the inspection port 7. A spray nozzle is mounted at one end of the water spray pipe 8 and extends into the gas discharge pipe 38, so as to prevent the blockage of the gas discharge pipe 38 and keep the gas discharge pipe 38 to be always unobstructed.

In the invention, a bio-oil discharge port 40 is disposed at the inner floor of the isolation room 1 to discharge bio-oil from the isolation room 1. In this way, recovery and utilization of resources are achieved, the labor intensity of operators is reduced, and the environmental pollution in workshops is prevented.

EXAMPLE

Anaerobic Pyrolysis Treatment of Dead-of-Disease Pigs

When the anaerobic pyrolysis device began to operate, bodies of dead-of-disease pigs, after being treated by a crusher, were conveyed to the anaerobic pyrolysis chamber 20 through the screw conveyor 37 and the conveying pipeline 12 of the anaerobic pyrolysis device. As viewed from one end of the anaerobic pyrolysis chamber 20, the anaerobic pyrolysis chamber 20 rotated at 1-3 rotations per minute in the clockwise direction. The combustor 47 began to work (the fuel of the combustor may be natural gas, coal gas, or uncondensed combustible gases), and the temperature of the combustion chamber began to increase. When the temperature of the combustion chamber was increased to 300-500° C., the vaporization and pyrolysis reaction of tissues of bodies of dead-of-disease pigs began at this high temperature, to generate a gas composed of steam, hydrogen, methane, ethane, carbon monoxide, etc. The generated gas was conveyed through the gas discharge pipe 38 and the gas discharge port 39 to the spray column 48 for performing a cleaning and separation treatment, such that steam in the gas was condensed into condensed water, and remaining uncondensed combustible gases were conveyed to the combustor 47 through the coal gas discharge and feed fan 53, to be recovered and reutilized as fuel of the anaerobic pyrolysis device.

When the temperature of the combustion chamber was increased to 500-600° C., reactions such as dehydrogenation, thermal condensation, and carbonization were accomplished, to convert the tissues of bodies of dead-of-disease pigs to organic carbon. The organic carbon was continuously heated to 750-900° C., and activated steam was delivered through the external steam pipe 27, the rotatable joint 28, the connecting hose 31, and the activated steam conveying pipe 33 to the anaerobic pyrolysis chamber 20, where it carried out an activation reaction with the organic carbon to perform an activation treatment on the organic carbon. The activated organic carbon after activation may be used as a water-treating material and a soil amendment.

After activation, as viewed from one end of the anaerobic pyrolysis chamber 20, the anaerobic pyrolysis chamber 20 rotated at 1-3 rotations per minute in the counterclockwise direction. The activated organic carbon was passed into the cooling device 49 via the discharge plate 14 in the anaerobic pyrolysis chamber 20, the conveying pipeline 12, the spiral plate 4, the discharge pipe 5, and the discharge port 6.

In the operation process of the anaerobic pyrolysis device, when the temperature was excessively high, or the oxygen content was excessively high, or the concentration of combustible gases was excessively high in the isolation room 1, steam was input to the isolation room 1 through the steam input pipe 45, to lower the temperature, the concentration of combustible gases, or the oxygen content in the isolation room 1.

In the operation process of the anaerobic pyrolysis device, bio-oil in the isolation room 1 was discharged from the bio-oil discharge port 40 at the bottom and flowed into oil storage tank 50.

In the operation process of the anaerobic pyrolysis device, the wireless temperature sensor 29, the temperature sensor 41, the pressure sensor 42, the combustible gas sensor 43, the oxygen content sensor 44, etc., transmitted parameters such as temperature, pressure, combustible gas, oxygen content at respective sites of the anaerobic pyrolysis device to electrical control cabin 54 respectively, and the anaerobic pyrolysis device was safely operated under the control of the electrical control cabin 54.

The invention claimed is:

1. A device for anaerobic pyrolysis treatment of dead-of-disease livestock and municipal organic refuse, comprising:
    an anaerobic pyrolysis device, wherein an isolation room and an equipment room are sequentially disposed at one end of the anaerobic pyrolysis device, a dust collection room is disposed between the isolation room and the equipment room, an air outlet is disposed on the top of the dust collection room, and the air outlet is connected with a dedusting device; a power room is disposed at the other end of the anaerobic pyrolysis device, and a combustion chamber of the anaerobic pyrolysis device is disposed between the power room and the equipment room;
    an anaerobic pyrolysis chamber is disposed inside the combustion chamber, a conveying pipeline is disposed at one end and a driving cylinder is disposed at the other end of the anaerobic pyrolysis chamber, wherein the outer end of the conveying pipeline extends into the isolation room, and the driving cylinder is in the power room;
    a gas discharge pipe is disposed in the isolation room, the lower part of the gas discharge pipe is connected with a gas discharge port at the bottom of the isolation room, the gas discharge port is connected with a spray column, a gas outlet of the spray column is connected with an air inlet of a coal gas discharge and feed fan, and an air outlet of the coal gas discharge and feed fan is connected with a combustor; and an inspection port is disposed on the top of the isolation room which is vertically opposite to the gas discharge pipe;
    two water spray pipes are mounted in the inspection port on the top of the isolation room, one of the water spray pipes extends into the gas discharge pipe, the other one of the water spray pipes extends to an inner floor of the isolation room, and a bio-oil discharge port is disposed at the inner floor of the isolation room;
    a conveying sleeve is mounted along the axis in the conveying pipeline, one end of the conveying sleeve protrudes from the conveying pipeline, and the other end of the conveying sleeve extends into the anaerobic pyrolysis chamber and is fixed to a discharge plate by welding; a spiral plate is disposed in the conveying pipeline, the vertical intersection angle between the spiral plate and the conveying pipeline is 5°-15° sinistrally, and the height of the spiral plate is 20-30% of the diameter of the conveying pipeline; and a screw conveyor is disposed on the outer face of the isolation room, the screw conveyor passing through the isolation room and extending into the conveying sleeve;
    an activated steam conveying pipe is mounted along the axis in the driving cylinder, an inner end plate of the activated steam conveying pipe is in close contact with a baffle ring of the driving cylinder, and a fixing plate of the activated steam conveying pipe is in connection with the outer end of the driving cylinder;
    a wireless temperature transmitter is mounted on the fixing plate, a sensing element of the wireless temperature sensor is horizontally mounted along the activated steam conveying pipe and extends into the anaerobic pyrolysis chamber; and
    the outer end of the activated steam conveying pipe is connected with an external steam pipe.

2. The device according to claim 1, wherein the housing of the combustion chamber is a thermal insulation material.

3. The device according to claim 1, wherein a temperature sensor, a pressure sensor, a combustible gas sensor, an oxygen content sensor, and a steam input pipe are disposed on the top of the isolation room.

4. The device according to claim 3, wherein the wireless temperature sensor, the temperature sensor, the pressure sensor, the combustible gas sensor, and the oxygen content sensor transmit parameters of temperature, pressure, combustible gas, oxygen content at respective sites of the anaerobic pyrolysis device to an electrical control cabin respectively, and the anaerobic pyrolysis device is operated under the control of the electrical control cabin.

5. The device according to claim 1, wherein the wireless temperature sensor, the temperature sensor, the pressure sensor, the combustible gas sensor, and the oxygen content sensor transmit parameters of temperature, pressure, combustible gas, oxygen content at respective sites of the anaerobic pyrolysis device to an electrical control cabin respectively, and the anaerobic pyrolysis device is operated under the control of the electrical control cabin.

6. The device according to claim 1, wherein an explosion proof and inspection port is disposed on the top of the isolation room.

7. The device according to claim 1, wherein the fixing plate of the activated steam conveying pipe is in connection with a flange plate at the outer end of the driving cylinder by fastening with a bolt.

8. The device according to claim 1, wherein the outer end of the activated steam conveying pipe is connected with the external steam pipe via a connecting hose and a rotatable joint.

9. A method for anaerobic pyrolysis treatment of dead-of-disease livestock and municipal organic refuse, comprising the steps of:
    conveying bodies of dead-of-disease pigs or/and municipal organic refuse, after being treated by a crusher, to a rotating anaerobic pyrolysis chamber through a screw conveyor and a conveying pipeline of an anaerobic pyrolysis device;
    increasing the temperature inside the anaerobic pyrolysis chamber to 300-500° C. to perform vaporization and pyrolysis reaction of the bodies of dead-of-disease pigs or/and the municipal organic refuse at high temperature, and conveying the generated gas through a gas discharge pipe and a gas discharge port to a spray column for performing a cleaning and separation treatment, such that steam in the gas is condensed into condensed water, and the remaining uncondensed combustible gases are conveyed to a combustor through a coal gas discharge and feed fan, to be recovered and reutilized as fuel of the anaerobic pyrolysis device; and discharging bio-oil in an isolation room from a bio-oil discharge port at the bottom to allow the bio-oil flow into an oil storage tank;

increasing the temperature inside the anaerobic pyrolysis chamber to 500-600° C., to convert the bodies of dead-of-disease pigs or/and the municipal organic refuse to organic carbon through dehydrogenation, thermal condensation and carbonization reactions; continuously heating the organic carbon to 750-900° C., and feeding activated steam through an activated steam conveying pipe into the anaerobic pyrolysis chamber, for carrying out an activation reaction with the organic carbon, so as to perform an activation treatment on the organic carbon; and reversely rotating the anaerobic pyrolysis chamber after activation, such that the activated organic carbon passes through a discharge port in the anaerobic pyrolysis chamber and enters into a cooling device.

10. The method according to claim 9, wherein the gas generated by increasing the temperature inside the anaerobic pyrolysis chamber to 300-500° C. is a gas composed of steam, hydrogen, methane, ethane, and carbon monoxide.

11. The method according to claim 9, wherein the activated organic carbon is used as a water-treating material and a soil amendment.

* * * * *